United States Patent
Hwang et al.

(10) Patent No.: US 6,535,324 B1
(45) Date of Patent: Mar. 18, 2003

(54) BI-DIRECTIONAL WAVELENGTH-SELECTIVE OPTICAL DATA APPARATUS

(75) Inventors: In-Kag Hwang, Cupertino, CA (US); Myung-Soo Lee, Chonju (KR); Byoung Yoon Kim, Mountain View, CA (US); Wayne V. Sorin, Mountain View, CA (US)

(73) Assignee: Novera Optics, Inc., San Jose, CA (US)

( * ) Notice: Subject to any disclaimer, the term of this patent is extended or adjusted under 35 U.S.C. 154(b) by 0 days.

(21) Appl. No.: 09/677,378

(22) Filed: Sep. 26, 2000

Related U.S. Application Data

(60) Provisional application No. 60/207,045, filed on May 23, 2000.

(51) Int. Cl.$^7$ ............................. G02F 1/09; H04B 10/12
(52) U.S. Cl. ...................... 359/283; 359/341; 359/282
(58) Field of Search ................................ 359/283, 341, 359/282, 484, 495, 497, 900

(56) References Cited

U.S. PATENT DOCUMENTS

| | | | | |
|---|---|---|---|---|
| 5,204,771 A | * | 4/1993 | Koga | 359/281 |
| 6,101,026 A | * | 8/2000 | Bancy | 359/341 |
| 6,151,157 A | | 11/2000 | Ball et al. | 359/341 |
| 6,151,427 A | | 11/2000 | Satorius | 385/7 |
| 2001/0053022 A1 | * | 12/2001 | Tai et al. | 359/484 |

OTHER PUBLICATIONS

J.N. Blake, B.Y. Kim, H.E. Engan, and H.J. Shaw, "Analysis of intermodal coupling in a two-mode fiber with periodic microbends", Opt. Lett., vol. 12, 281–283 (1987).

B.Y. Kim, J.N. Blake, H.E. Engan, and H.J. Shaw, "Acousto-optic frequency-shifting in two-mode optical fibers", OFS '86, Tokyo, Japan (Oct. 8–10, 1986).

H.E. Engan, B.Y. Kim, J.N. Blake, and H.J. Shaw, "Propagation and optical interaction of guided acoustic waves in two-mode optical fibers", Journal of Lightwave Technology, vol. 6, 428–436 (1988).

J.O. Askautrud and H.E. Engan, "Fiberoptic frequency shifter with no mode change using cascaded acousto–optic interaction regions", Opt. Lett., vol. 15, 649–651 (1990).

H.E. Engan, T. Myrtveit, and J.O. Askautrud, "All–fiber acousto–optic frequency shifter excited by focused surface acoustic waves", Opt. Lett., vol. 16, 24–26 (1991).

H.E. Engan, D.Östling, P.O. Kval, and J.O. Askautrud, "Wideband operation of horns for excitation of acoustic modes in optical fibers", OFS(10), Glasgow, Oct. 11–13, 1994, 568–571 (SPIE Proc. 2360).

D. Östling and H.E. Engan, "Narrow–band acousto–optic tunable filtering in a two–mode fiber", Opt. Lett., vol. 20, 1247–1249 (1995).

H.E. Engan, "Analysis of polarization mode coupling by acoustic torsional waves in optical fibers", J. Opt. Soc. Am. A., vol. 13, 112–118 (1996).

D. Östling and H.E. Engan: "Spectral flattening by an all–fiber acousto–optic tunable filter", 1995 IEEE Ultrasonics Symposium, 837–840.

(List continued on next page.)

*Primary Examiner*—Georgia Epps
*Assistant Examiner*—Timothy Thompson
(74) *Attorney, Agent, or Firm*—Blakely, Sokoloff, Taylor & Zafman LLP

(57) ABSTRACT

An optical data apparatus has a first polarization splitter configured to receive an input and split the input into first and second orthogonal polarizations. A second polarization splitter is included and configured to combine the first and second orthogonal polarizations. A non-reciprocal phase rotator is positioned between the first and second polarization splitters. At least one birefringent crystal is positioned between the first and second polarization splitters to create wavelength dependent bi-directionality.

49 Claims, 8 Drawing Sheets

OTHER PUBLICATIONS

D. Östling and H.E. Engan: "Broadband spatial mode conversion by chirped fiber bending", Opt. Lett., vol. 21, 192–194 (1996).

D. Östling and H.E. Engan: "Polarization–selective mode coupling in two–mode Hi–Bi fibers", Journal of Lightwave Technology, vol. 15, 312–320 (1997).

D. Östling, B. Langli, and H.E. Engan: "Intermodal beat lengths in birefringent two–mode fibers", Opt. Lett., vol. 21, 1553–1555 (1996).

H.E.Engan, "Acoustic torsional waves used for coupling between optical polarization modes in optical fibers", 1996 IEEE Ultrasonics Symposium, 799–802.

D. Östling and H.E. Engan: "Acousto–optic tunable filters in two–mode fibers", Optical Fiber Technology, vol. 3, 177–183 (1997).

B. Langli, P. G. Sinha and K. Bløtekjær, "Acousto–Optic Mode Coupling of Partially Coherent Light in Two–Mode Fibers", Optical Review, vol. 4, No. 1A, pp. 121–129, Jan./Feb. 1997.

T.A. Birks, P.S.J. Russell and C.N. Pannell, "Low power acousto–optic device based on a tapered single–mode fiber", IEEE Photonics Technol. Lett., vol. 6, p. 725–727 (1994).

M. Berwick and D.A. Jackson, "Coaxial optical–fiber frequency shifter", Opt. Lett., vol. 17, 270–272 (1992).

J. Blake and P. Siemsen, "Practical compact high performance fiber–optic frequency shifter", Proc. $9^{th}$ OFS Conference, Firenze, pp. 301–304 (1993).

W. P. Risk, G. S. Kino and H. J. Shaw, "Fiber–optic frequency shifter using a surface acoustic wave incident at an oblique angle", Optics Letters, vol. 11, No. 2, pp 115–117, 1986.

W. P. Risk, R. C. Youngquist, G. S. Kino and H. J. Shaw, "Acousto–optic frequency shifting in birefringent fiber", Optics Letters, vol. 9, No. 7, pp 309–311, 1984.

W. P. Risk and–G. S. Kino, "Acousto–optic fiber–optic frequency shifter using periodic contact with a copropagating surface acoustic wave", Optics Letters, vol. 11, No. 5, pp 336–338, 1986.

W. P. Risk and G. S. Kino, "Acousto–optic polarization coupler and intensity modulator for birefringent fiber", Optics Letters, vol. 11, No. 1, pp 48–50, 1986.

W.P. Risk, G.S. Kino and B.T. Khuri–Yakub, "Tunable optical filter in fiber–optic form", Opt. Lett., vol. 11, p. 578–580 (1986).

S.F. Su, R. Olshansky, D.A. Smith and J.E. Baran, "Flattening of erbium–doped fibre amplifier gain spectrum using an acousto–optic tunable filter", Electron. Lett., vol. 29, p. 477–478 (1993).

Yijiang Chen, "Acousto–optic frequency shifter using coaxial fibers", Optical and Quant. Elect., vol. 21, pp. 491–498 (1989).

J. Ji, D. Uttam and B. Culshaw, "Acousto–optic frequency shifting in ordinary single–mode fibre", Electronics Letters, vol. 22, No. 21, pp 1141–1142, 1986.

C. N. Pannell, R. P. Tatam, J. D. C. Jones and D. A. Jackson, "Optical frequency shifter using linearly birefringent monomode fibre", Electronics Letters, vol. 23, No. 16, pp 847–848, 1987.

K. Nosu, H. F. Taylor, S. C. Rashleigh and J. F. Weller, "Acousto–optic phase modulator and frequency shifter for single–mode fibers", Ultrasonics Symposium, pp 476–481, 1983.

Sorin, W.V. et al, "Phase Velocity Measuerments using Prism Output for Single and Few–Mode Fibers", Optics Letters, Feb. 1986, vol. 11, No. 2, pp. 106–108.

Blake, B.Y. et al, "Fiber–Optic Modal Coupler using Periodic Microbending", Optics Letters, Mar. 1986, vol. 11, No. 3, pp. 177–179.

Kim, B.Y. et al., "All–Fiber Acousto–Optic Frequency Shifter", Optics Letters, Jun. 1986, vol. 11, No. 6, pp. 389–391.

Sorin, W.R. et al, "Highly Selective Evanescent Modal Filter fot Two–Mode Optical Fibers", Optics Letters, Sep. 1986, vol. 11, No. 9, pp. 581–583.

Blake, J.N. et al, "Analysis of Intermodal Coupling in a Two–Mode Fiber with Periodic Microbends", Optics Letters, Apr. 1987, vol. 12, No. 4, pp. 281–283.

Kim, B.Y. et al, "Use of Highly Elliptical Core Fibers for Two–Mode Fiber Devices", Optics Letters, Sep. 1987, vol. 12, No. 9, pp. 729–731.

Blake, J.N., et al, "Strain Effects on Highly Elliptical Core Two–Mode Fibers", Optics Letters, Sep. 1987, vol. 12, No. 9, pp. 732–734.

Engan, H.E. et al, Propagation and Optical Interaction of Guided Acoustic Waves in Two–Mode Optical Fibers, IEEE Journal of Lightwave Technology, Mar. 1988, vol. 6, No. 3, pp. 428–436.

Park, H.G. et al, "Intermodal Coupler using Permanently Photo–Indiced Grating in Two–Mode Optical Fibre", Electronic Letters, Jun. 8, 1989, vol. 25, No. 12, pp. 797–799.

Park, H.G. et al, "All–Optical Intermodl Switch using Periodic Coupling in a Two–Mode Waveguide", Optics Letters, Aug. 15, 1989, vol. 14, No. 16, pp. 877–879.

Huang, S.Y. et al, "Perturbation Effects on Mode Propagation in Highly Elliptical Core Two–Mode Fibers", IEEE Journal of Lightwave Technology, Jan. 1990, vol. 8, No. 1, pp. 23–33.

Koh, Y.W. et al, "Strain Effects on Two Mode Fiber Gratings", Optics Letters, Apr. 1, 1993, vol. 18, No. 7, pp. 497–499.

Yun, S.H. et al, "All–fiber Tunable Filter and Laser based on Two–mode Fiber", Optics Letters, Jan. 1996, vol. 21, No. 1, pp. 27–29.

Yun, S.H. et al, "Suppression of Polarization Dependence in a Two–Mode Fiber Acousto–Optic Device", Optics Letters, Jun. 15, 1996, vol. 21, No. 12, pp. 908–910.

Kim, H.S. et al, "Longitudinal Mode Control in Few–Mode Erbium–Doped Fiber Lasers", Optics Letters, Aug. 1, 1996, vol. 21, No. 15, pp. 1144–1146.

Jeon, M.Y. et al, "An Electronically Wavelength–Tunable Mode–Locked Fiber Laser Using an All–Fiber Acoustooptic Tunable Filter", IEEE Photonics Technology Letters, Dec. 1996, vol. 8, No. 12, pp. 1618–1620.

Kim, H.S. et al, "All–fiber acousto–optic tunable notch filter with electronically controllable profile", Optics Letters, Oct. 1, 1997, vol. 22, No. 19, pp. 1476–1478.

Yun, S.H. et al, "Wavelength–Swept Fiber Laser with Frequency Shifted Feedback and Resonantly Swept Intra–Cavity Acoustooptic Tunable Filter", IEEE Journal of Selected Topics in Quantum Electronics, Aug. 1997, vol. 3, No. 4, pp. 1087–1096 (Invited Paper).

Jeon, M.Y. et al, "Harmonically mode–locked fiber laser with an acoutso–optic modulator in a Sagnac loop and Faraday rotating mirror cavity", Optics Communications, Apr. 15, 1998, vol. 149, pp. 312–316.

Kim, H.S. et al, "Actively gain–flattened erbium–doped fiber amplifier over 35nm using all–fiber acoustooptic tunable filters", *IEEE Photonics Technology Letters,* Jun. 1998, vol. 10, No. 6, pp. 790–792.

Hwang, I.K. et al, "Long–period fiber gratings based on periodic microbends", *Optics Letters,* Sep. 15, 1999, vol. 24, No. 18, pp. 1263–1265.

Yun, S.H. et al, "Dynamic Erbium–Doped Fiber Amplifier Based on Active Gain Flattening with Fiber Acoustooptic Tunable Filters", *IEEE Photonics Technology Letters,* Oct. 1999, vol. 11, No. 10, pp. 1229–1231.

Blake, J.N. et al, "All–Fiber Acousto–Optic Frequency Shifter using Two–Mode Fiber", *Proceedings of the SPIE Fiber Optic Gyros,* Sep. 1986, vol. 719, pp. 92–100.

Blake, B.Y. et al, "Acousto–Optic Frequency Shifting in Two–Mode Optical Fibers", *OFS '86,* Tokyo, Japan, Oct. 8–10, 1988, pp. 159–162.

Engan, H.E. et al, "Optical Frequency Shifting in Two–Mode Optical Fibers by Flexural Acoustic Waves", *IEEE 1986 Ultrasonics Symposium,* Nov. 17–19, 1986, pp. 435–438.

Huang, S.Y. et al, "Mode Characteristics of Highly Elliptical Core Two–Mode Fibers under Purterbations", *OFS '88,* New Orleans, Louisiana, Jan. 27–29, 1988, pp. 14–17.

Kim, B.Y. et al, "Few–Mode Fiber Devices", *OFS '88,* New Orleans, Louisiana, Jan. 27–29, 1988, pp. 146–149, (Invited Paper).

Kim, B.Y. et al, "Fiber–Optic Device Reasearch at Stanford University", *Proceedings SPIE, Fiber Optic and Laser Sensors,* Boston, Massachusetts, Sep. 5–7, 1989, vol. 1169, pp. 10–15, (Invited Paper).

Kim, B.Y. et al, "Few–Mode Fiber Devices", *ICOESE '90,* Beijing, China, Aug. 1990, vol. 2, pp. 146–149, (Invited Paper).

Koh, Y.W. et al, "Mode Coupling Fiber Gratings for Fiber Optic Devices", *OFS–9,* Firenze, Italia, May 4–6, 1993, pp. 35–38.

Yun, S.H. et al, "All–Fiber Acousto–Optic Tunable Filter", *OFC '95,* San Diego, California, Feb. 26–Mar. 3, 1995, pp. 186–187.

Yun, S.H. et al, "Electronically Tunabole Fiber Laser Using All–Fiber Acousto–Optic Tunable Filter", *IOOC '95 (10$^{th}$ International Conference on Integrated Optics and Optical Fibre Communication*) Hong Kong, Jun. 26–30, 1995, pp. 22–23.

Yun, S.H. et al, "Polarization Dependenceof Two–Mode Fiber–Acousto–Optic Device", *OFS–11,* Sapporo, Hokkaido, Japan, May 21–24, 1996, pp. 478–481.

Jeon, M.Y. et al, "Harmonically Mode–Locked Fiber Using an All–Fiber Acousto–Optic Tunable Filter", *OFC '97,* Dallas, Texas, Feb. 16–22, 1997, pp. 166–167.

Yun, S.H. et al, "Wavelength –swept Fiber Laser with Frequency–Shifted Feedback", *OFC '97,* Dallas, Texas, Feb. 16, 1997, pp. 30–31.

Kim, H.S. et al, "Single–Mode–Fiber Acousto–Optic Tunable Notch Filter", *2$^{nd}$ Optoelectronics & Communications Conference '97,* Jul. 8–11, 1997, pp. 226–227.

Yun, S.H. et al, "Fiber grating sensor array demodulation using wavelength–swept fiber laser", *OFS–12,* Williamsburg, Virginia, Oct. 28–31, 1997.

Hwang, I.K. et al, "All–fiber nonreciprocal comb filter with wavelength tunability", *OFC '98,* ThQ5, San Jose, USA, Feb. 22–27, 1998, pp. 336–338.

Kim, H.S. et al, "Dynamic gain equalization of erbium–doped filter amplifier with all–fiber–acousto–optic tunable filters", *OFC '98,* WG4, San Jose, USA, Feb. 22–27, 1998, pp. 136–138.

Koh, Y.W. et al, "Broadband Polarization–Insensitive All–Fiber Acousto–Optic Modualtor", *OFC '98,* WM50, San Jose, USA, Feb. 22–27, vol. 2, pp. 239–240.

Oh, K. et al., "Characterization of elliptic core fiber acousto–optic tunable filters operated in the single mode and the multi–mode range", *OFC '98,* WM59, San Jose, USA, vol. 2, pp. 250–251.

Yun, S.H. et al, "Generation of self–starting mode–locked pulses in wavelength–swept fiber lasers", *CLEO/IQEC '98,* San Francisco, USA, May 3–8, 1998.

Hwang, I.K. et al, "Long–Period Gratings based on Arch–induced Microbends", *OECC '98,* Chiba, Japan, Jul. 12–16, 1998, pp. 144–145.

Kim, B.Y. et al, "Fiber Based Acousto–Optic Filters", *OFC/IOOC '99,* San Diego, USA, Feb. 21–26, 1999, pp. 199–201, (Invited Paper).

Hwang, I.K. et al, "Profile–controlled long–period fiber gratings based on microbends", *OFC/IOOC '99,* San Diego, California, Feb. 21–26, 1999, pp. 177–179.

Park, H.S. et al, "All–fiber add–drop multiplexer using a tilted fiber Bragg grating and mode–selective couplers", *OFC/IOOC '99,* San Diego, California, USA, Feb. 21–26, 1999, TuH6, pp. 91–93.

Kim, B.Y., "Acousto–optic Components for WDM Applications", *IEEE/LEOS Summer Topical Meetings,* San Diego, USA, Jul. 26–28, 1999, pp. 47–48, (Invited Paper).

Kim, B.Y., "Acousto–optic filters for fiber systems", *ICO–128,* San Francisco, USA, Aug. 2–6, 1999, pp. 92–93, (Invited Paper).

Song, K.Y. et al, "High Performance Fused–type Mode Selective Couple for Two–mode Fiber Devices", *OFC 2000,* Baltimore, USA, Mar. 5–10, 2000, vol. 37, TuB5.

Risk, W.P. et al, "Acousto–optic frequency shifting in birefringent fiber", *Optics Letters,* 1984, vol. 9, No. 7, pp. 309–311.

Birks, T.A. et al, "Four–port fiber frequency shifter with a null tapre coupler", *Optics Letters,* 1994, vol. 19, No. 23, pp. 1964–1966.

Berwick, M. et al, "Coaxial optical–fiber frequency shifter", *Optics Letters,* Feb. 15, 1992, vol. 17, No. 4, pp. 270–272.

Lisboa, O. et al, "New configuration for an optical fiber acousto–optic frequency shifter", *Proc. Soc. Photo–Opt. Instrum. Eng.,* Mar. 13–14, 1990, vol. 1267, pp. 17–23.

Culverhouse, D.O. et al, "Four port fused taper acousto–optic deviceusing standard single mode telecommunication fiber", *Electronic Letters,* Jul. 20, 1995, vol. 31, No. 15, pp. 1279–1280.

Culverhouse, D.O. et al, "Low–loss all–fiber acousto–optic tunable filter", *Optic Letters,* 1997, vol. 22, No. 2, pp. 96–98.

Dimmick, T.E. et al, "Compact all–fiber acoustooptic tunable filters with small bandwidth–length product", *IEEE Photonics Technology Letters,* Sep. 2000, vol. 12, No. 9, pp. 1210–1212.

Kakarantzas, G. et al, "High strain–induced wavelength tunablility in tapered fibre acousto–optic filters", *Electronics Letters,* Jul. 6, 2000, vol. 36, No. 14, pp. 1187–1888.

Dimmick, T.E. et al, "Narrow–band acousto–optic tunable filter fabricated from highly uniform tapered optical fiber", *Optical Fiber Communication Conference, 2000,* 2000, vol. 4, pp. 25–27.

Russell, P.S.J. et al, "All–Fibre Frequency Shifters, Modulators and Switches", *Lasers and Electro–Optics Europe, 1998,* 1998, p. 349.

Birks, T.A. et al, "Control of bandwidth in fiber acousto–optic tunable filters and other single–mode null coupler devices", *Lasers and Electro–Optics, 1997,* 1997, vol. 11, pp. 444–445.

Culverhouse, D.O. et al, "40–MHz all–fiber acoustooptic frequency shifter", *IEEE Photonics Technology Letters,* Dec. 1996, vol. 8, No. 12, pp. 1636–1637.

Birks, T.A. et al, "The acousto–optic effect in single–mode fiber tapers and couplers", *Journal of Lightwave Technology,* Nov. 1996, vol. 14, No. 11, pp. 2519–2529.

Culverhouse, D.O. et al, "All–fibre Acousto–optic Tunable Filter Based On a Null Coupler", *Optical Communication 1996. ECOC '96,* 1996, vol. 3, pp. 317–320.

Birks, T.A. et al, "Low power acousto–optic device based on a tapered single–mode fiber", *IEEE Photonics Technology Letters,* Jun. 1994, vol. 6, No. 6, pp. 725–727.

Zayer, N.K. et al, "In situ ellipsometric monitoring of growth of zinc oxide thin films with applications to high–frequency fiber acousto–optic components", *Lasers and Electro–Optics, 1998. CLEO '98,* 1998, pp. 251–252.

Pannell, C.N. et al, "In–fiber and fiber–compatible acoustooptic components", *Jouranl of Lightwave Technology,* Jul. 1995, vol. 13, No. 7, pp. 1429–1434.

Abdulhalim, I. et al, "Acoustooptic in–fiber modulator acoustic focusing", *IEEE Photonics Technology Letters,* Sep. 1993, vol. 5, No. 9, pp. 999–1002.

Huang, D.W. et al, "Q–switched all–fiber laser with an acoustically modulated fiber attenuator", *IEEE Photonics Technology Letters,* Sep. 2000, vol. 12, No. 9, pp. 1153–1155.

Huang, D.W. et al, "Reflectivity–tunable fiber Bragg grating reflectors", *IEEE Photonics Technology Letters,* Feb. 2000, vol. 12, No. 2, pp. 176–178.

Liu, W.F. et al, "Switchable narrow bandwidth comb filter based on an acoustooptic superlattice modulator in Sinc–sampled fiber gratings", *Lasers and Electro–Optics, 1999,* 1999, pp. 77–78.

Liu, W.F. et al, "100% efficient narrow–band acoustooptic tunable reflector using fiber Bragg grating", *Journal of Lightwave Technology,* Nov., 1998, vol. 16, No. 11, pp. 2006–2009.

Patterson, D.B. et al, "Frequency shifting in optical fiber using a Saw Horn", *Ultrasonics Symposium, 1990,* 1990, vol. 2, pp. 617–620.

Patterson, D.B. et al, "Noninvasive switchable acousto–optic taps for optical fiber", *Journal of Lightwave Technology,* Sep. 1990, vol. 8, No. 9, pp. 1304–1312.

* cited by examiner

OPTICAL TRANSMISSION SPECTRA

BI-DIRECTIONAL WAVELENGTH-SELECTIVE OPTICAL DATA APPARATUS

This application claims benefit of the filing date of provisional patent application U.S. Serial No. 60/207,045 filed May 23, 2000.

FIELD OF THE INVENTION

This invention relates generally to optical isolators, circulators and interleavers, and more particularly to wavelength dependent optical isolators, wavelength dependent circulators and non-reciprocal wavelength interleavers with wavelength dependent bi-directionality.

DESCRIPTION OF THE RELATED ART

Optical communications systems, as well as other optical technologies, require devices that manipulate optical signals that are in the form of light rays. One of the best known apparatus for such manipulation is the silica based optical fiber which is widely used for both short and long distance optical transmission. Additionally, other well known apparatus include couplers and multiplexers that have been developed to couple one or more optical signals into one or more optical fibers or waveguides. Some applications for transmission of optical signals also desirably use non-reciprocal apparatus or devices, where the propagation characteristics of light within the apparatus depends upon the direction of light propagation within the apparatus.

One type of such a non-reciprocal device is an optical circulator. An optical circulator has 3 or more. ports which permit light to pass from a first to a second port, for example, but not from the second port to the first port; instead light entering the second port passes to a third port. Another type of non-reciprocal device is an isolator. An isolator may be thought of as a two-port circulator. However, the term isolator is the preferred term.

Many types of optical devices, including circulators and isolators, have been developed for commercial applications. For many applications, such a device should be polarization independent to the external world; that is, device operation should not depend upon the polarization of the incoming light.

An optical isolator is a device that allows transmission of light in only one direction, but not in the opposite direction. It is widely used in optical systems to prevent unwanted optical back-reflection, which cause degradation of system performance. Optical isolators are required in particular in fiber-optic data transmission systems. The optical isolators are intended to prevent light reflected or diffracted at interfaces from impinging on optically active components, for example laser diodes or optical fiber amplifiers, and adversely affecting their operation.

The basic structure of a conventional optical isolator is composed of two polarizers and one Faraday rotator as shown in FIG. 1. The Faraday rotator rotates the polarization direction of linearly polarized input light by 45 degrees, but the rotation direction is dependant on the optical transmission direction. It is clockwise and counterclockwise for the light propagating to right and left, respectively, and this feature is the origin of nonreciporocity of the optical isolator. The two polarizers are aligned to have the difference of 45 degrees between their polarization axes.

When the light travels from left to right, it is vertically polarized by POL1, rotated by 45 degree in polarization direction by the Faraday rotator, and then goes through POL2 without undergoing optical loss. On the other hand, when the light travels from right to left, the polarization changed by Faraday rotator is orthogonal to POL1, and it is completely blocked by POL1.

The optical isolator of FIG. 1 does not function properly when the input beam has random polarization, because the light with polarization orthogonal to the first polarizer cannot be transmitted. This produces unacceptable polarization dependent loss for optical transmission systems.

There is a need for an improved wavelength dependent optical isolators, wavelength dependent circulators and non-reciprocal interleavers. There is a further need for wavelength selective optical isolators, wavelength dependent circulators and non-reciprocal interleavers that have wavelength dependent bi-directionality.

SUMMARY OF THE INVENTION

According, an object of the present invention is to provide an improved wavelength dependent optical isolator.

Another object of the present invention is to provide an improved wavelength dependent circulator.

A further object of the present invention is to provide an improved non-reciprocal wavelength interleaver Yet another object of the present invention is to provide wavelength dependent optical isolators, wavelength dependent circulators and non-reciprocal wavelength interleavers which allow different wavelengths to go in different directions.

Still another object of the present invention is to provide wavelength dependent optical isolators, wavelength dependent circulators and non-reciprocal wavelength interleavers that permit different wavelengths to go in opposite directions.

Another object of the present invention is to provide wavelength dependent optical isolators, wavelength dependent circulators and non-reciprocal wavelength interleavers with wavelength dependent bi-directionality.

A further object of the present invention is to provide wavelength dependent optical isolators, wavelength dependent circulators and non-reciprocal wavelength interleavers with adjustable wavelength directionality.

Yet another object of the present invention is to provide wavelength dependent optical isolators, wavelength dependent circulators and non-reciprocal wavelength interleavers with switchable wavelength directionality.

These and other objects of the present invention are achieved in an optical data apparatus with a first polarization splitter configured to receive an input and split the input into first and second orthogonal polarizations. A second polarization splitter is included and configured to combine the first and second orthogonal polarizations. A non-reciprocal phase rotator is positioned between the first and second polarization splitters. At least one birefringent crystal is positioned between the first and second polarization splitters to create wavelength dependent bi-directionality.

In another object of the present invention, an optical data apparatus includes a first isolator with a first polarization splitter configured to receive an input and split the input into first and second orthogonal polarizations, and a second polarization splitter configured to combine the first and second orthogonal polarizations. A non-reciprocal phase rotator is positioned between the first and second polarization splitters. At least one birefringent crystal is positioned between the first and second polarization splitters and creates wavelength dependent bi-directionality. An amplifier is coupled to the first isolator.

In another embodiment of the present invention, an optical data apparatus includes a first polarizing beam splitter with a first port and a second port. The first polarizing beam splitter receives an input and splits the input into first and second orthogonal polarizations. A second polarizing beam splitter has third and fourth ports. A non-reciprocal phase rotator is positioned between the first and second polarizing beam splitters. A first birefringent crystal is positioned between the first and second polarizing beam splitters.

DETAILED DESCRIPTION OF THE PREFERRED EMBODIMENTS

Figure 1:
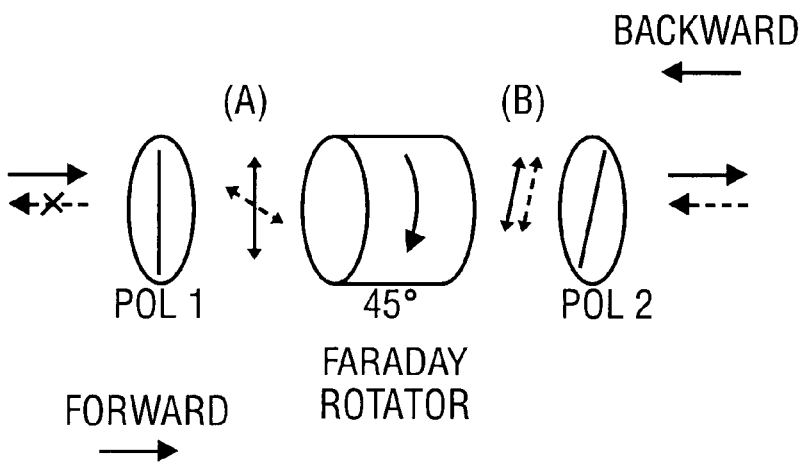
FIG. 1 is a schematic diagram of a conventional optical isolator.
Figure 2:
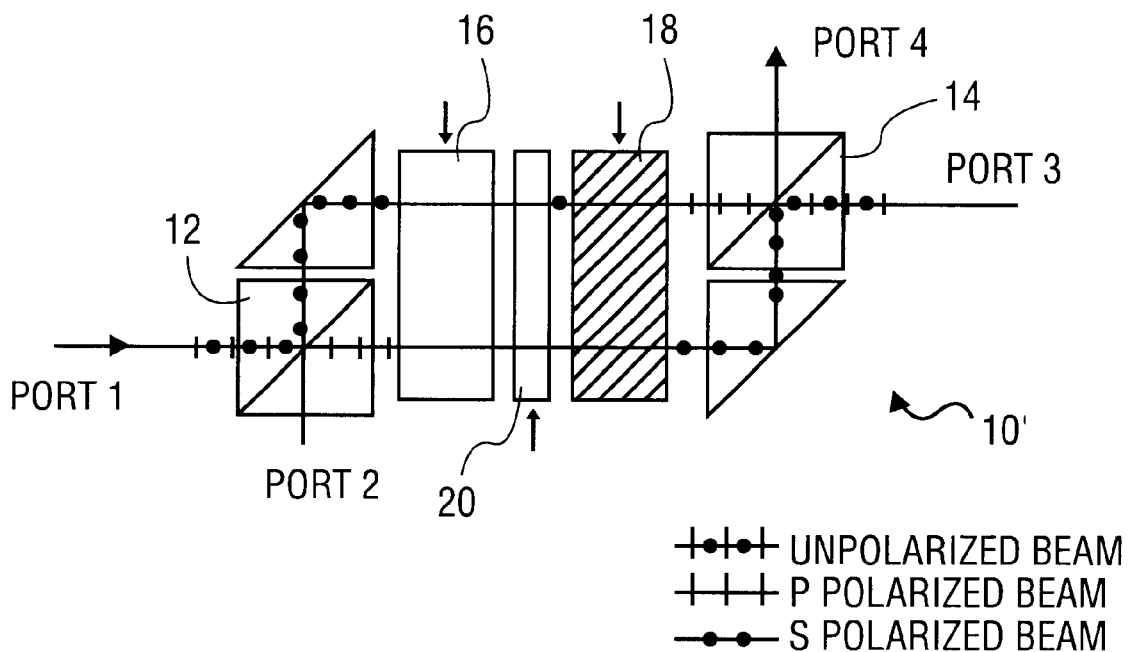
FIG. 2 is a schematic diagram of one embodiment of a wavelength selective optical circulator of the present invention.

One embodiment of an optical data apparatus 10' of the present invention is illustrated in FIG. 2 and includes first and second polarizing beam splitters 12 and 14. First polarizing beam splitter 12 receives and splits an input into first and second orthogonal polarizations. Second polarizing beam splitter 14 combines the first and second orthogonal polarizations for the purpose of creating a polarization independent transmission.

A non-reciprocal phase rotator 16 is positioned between the first and second polarizing beam splitters 12 and 14. Non-reciprocal phase rotator 16 creates transmission efficiencies that depend on the direction of the light. At least one birefringent crystal 18 is positioned between first and second polarizing beam splitters 12 and 14. Birefringent crystal 18 makes transmission efficiency dependent on wavelength of the light. Optionally included is a half-wave plate 20. Non-reciprocal phase rotator 16 can be a Faraday rotator, and more particularly, a current controlled Faraday rotator. Current control provides switching of wavelength directionality. When the current is on, different channels and bands go in different directions.

Figure 3:
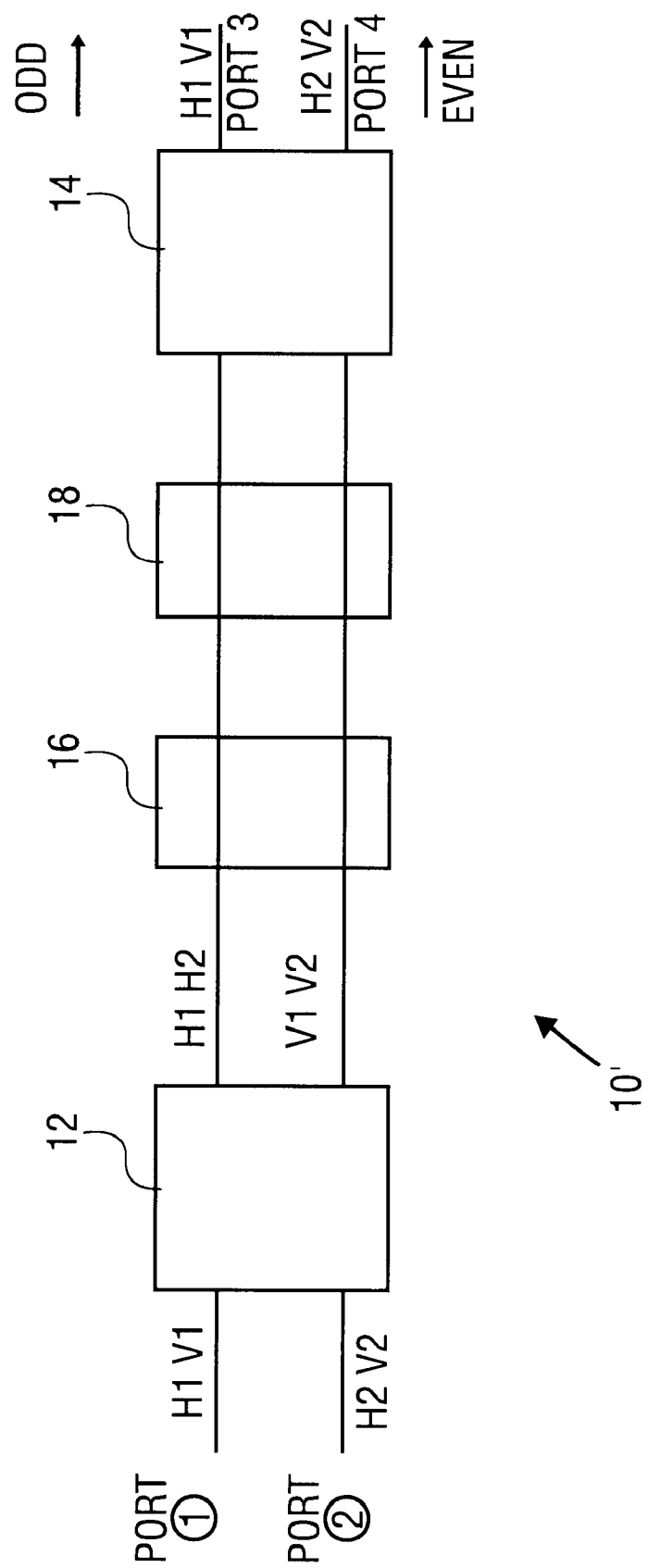
FIG. 3 is a schematic diagram of one embodiment of a wavelength dependent bi-directional optical data apparatus of the present invention with four ports and two polarizing beam splitters.
Figure 4:
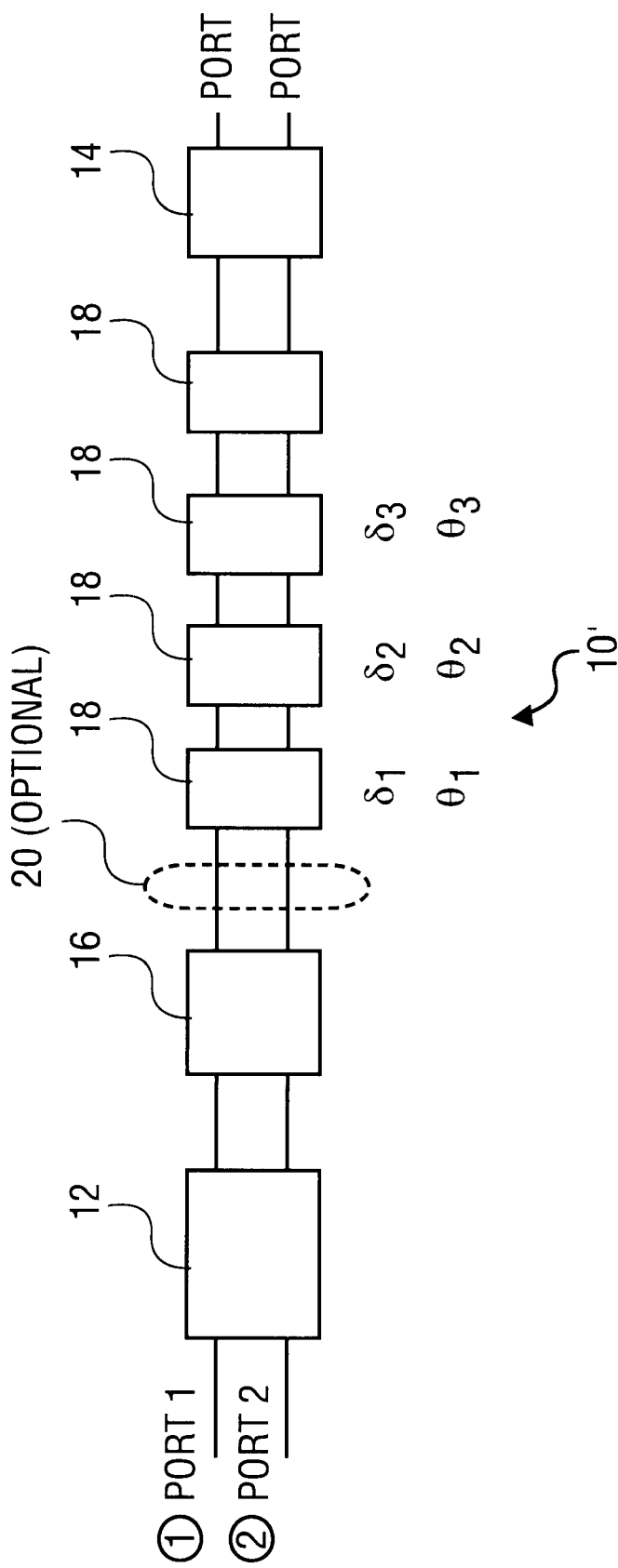
FIG. 4 is a schematic diagram of one embodiment of the FIG. 3 apparatus with multiple birefringent crystals.

FIG. 3 is the same as FIG. 2 but with a different configuration for polarizing beam splitters 12 and 14. FIG. 4 illustrates that the embodiments of FIGS. 2 and 3 can include multiple birefringent crystals 18.

Apparatus 10' can be, a wavelength dependent isolator, a wavelength dependent circulator or a non-reciprocal wavelength interleaver. When apparatus 10' is a wavelength dependent isolator only two ports are required and the isolation direction is given differently according to the channel or band. As a non-reciprocal wavelength interleaver, additional birefringent crystals 18 are typically required.

As illustrated in FIGS. 2, 3 and 4 apparatus 10' is a wavelength selective optical circulator with no polarization dependence. In one embodiment, birefringent crystal 18 is at 45 degrees to the incoming polarization. In other embodiments, a single birefringent crystal 18 is at an angle relative to the incoming polarization in the range of 25 to 65 degrees. A plurality individual birefringent crystals 18 can be utilized. With multiple birefringent crystals 18, the first birefringent crystal 18 need not be at 45 degrees. Each birefringent crystal 18 is preferably at a different angle relative to the incoming polarization. Additionally, all or some of the individual birefringent crystals 18 can have different thicknesses and/or have different delay widths between two orthogonal polarizations.

Birefringent crystal 18 can be made of a variety of materials including but not limited to $LiNbO_3$, $TiO_2$, calcite and the like. Birefringent crystal 18 can have a thickness in the range of 0.5 mm to 30 mm. and can also be in the form of a birefringent fiber. The thickness of birefringent crystal 18 depends on the amount of birefringence, and therefore the type of material used for birefringent crystal 18.

In FIGS. 2, 3 and 4 first polarizing beam splitter 12 divides an input beam into two beams of mutually orthogonal polarizations. Second polarizing beam splitter 14 combines them again. Between first and second polarizing beam splitters 12 and 14, each beam independently undergoes polarization changes in non-reciprocal phase rotator 16 and half-wave plate 20. Each beam independently undergoes polarization changes in non-reciprocal phase rotator 16, optional half-waveplate 20 and birefringent crystal 18. Half-waveplate 20 is designed to have negligible channel or band dependence and is used to reorient the polarization direction so that light enters birefringent crystal with the polarization angle of ±45 degree with respect to the axis of birefringent crystal 18.

When the two beams are combined again in second polarizing beam splitter 14, the combined beam goes out through port 3 or port 4 depending on the optical channel or band. The output port is reversed if light of the same channel or band enters apparatus 10' through port 2. Therefore, for the light of specific channel or bands, the optical transmission is allowed only from ports 1 to 2, 2 to 3, 3 to 4 and 4 to 1 while it is allowed only in directions from ports 1 to 4, 4 to 3, 3 to 2, and 2 to 1 for the light of the other channel or bands. The same channel or band coming in from different ports has different polarizations as it travels through birefringent crystal(s) 18 which prevents channel or band interference.

Two different sets of channels or bands can be interleaved with apparatus 10'. For example, port 1 can have one set of WDM channels, and port 2 can have a different set of WDM channels. First polarizing beam splitter 12 splits the input beam into first and second groups. One group has the odd channels or bands. The other group has the even channels or bands. This type of splitting of channels or bands is highly desirable in bi-directional WDM communication systems where the odd and even WDM channels flow in opposite directions at the same time in a single fiber.

When apparatus 10' is included in an optical amplifier, optical feedback is suppressed without disturbing bi-directional signal transmission. This type of bi-directional transmission reduces impairments due to optical non-linearities and therefore allows longer transmission distances.

The present invention provides wavelength dependent bi-directional devices. Odd channels or bands go in one direction and the even in the opposite direction. This arrangement is advantageous because there is larger spacing between each channel or band with an empty space between adjacent ones. The larger spacing provides easier tunability, lower cost and also permits products to be manufactured more readily because the density of channels and bands is half in both directions.

In one embodiment, the odd channels or bands are the output at port 3 from port 1 and the even ones are the output at port 4 from port 2. The even channels or bands on port 1 become the output on port 4 and the odd channels or bands of port 2 become the output of port 4. The odd channels or bands from port 1 are the output of port 3 and the even channels or bands from port 2 are the output of port 3. Port 3 collects the odd channels or bands from port 1 and the even ones from port 2. Port 4 collects the even channels or bands from port 1 and the odd ones from port 2.

Apparatus 10' can be dynamic and switchable by flipping the directionality of the channel and bands. This is achieved by the inclusion of an electromagnetic device such as a current controlled Faraday rotator for non-reciprocal phase rotator 16.

The birefringence axis of birefringent crystal 18 is aligned so that the two polarization components have the same optical power projected onto the two eigenaxes of birefringent crystal 18. In birefringent crystal 18 the two polarization components experience phase accumulation which is different by:

$$\Delta\phi = \frac{2\pi d \Delta n}{\lambda} \quad \text{(Eq. 1)}$$

where $\Delta n$ is the birefringent index difference, d is the thickness of birefringent crystal 18, and $\lambda$ is optical wavelength. Phase retardation determines the resulting optical polarization in front of second polarization splitter 14, and thus the optical transmittance into ports 3 and 4. Since the phase retardation $\Delta\phi$ in Eq. 1 continuously decreases as wavelength $\lambda$ increases, the transmission spectrum is given as a periodic function of optical wavelength.

When apparatus 10' is used for transmitting optical channels in bi-directional WDM systems, the ideal filter spectrum is a rectangular shape with a flat top and bottom rather than the sinusoidal spectrum. To produce a filter profile other than the sinusoidal profile multiple delays with separate phase retardation, as described in Equation 1, can be used. This can be achieved with the use of a cascade of multiple birefringent crystals 16. By using the proper thickness and angles between multiple birefringent crystals 18 multiple delays can be created which are need to make a more flat topped filter response.

The filter response can be modified by cascading multiple birefringent plates as illustrated in FIG. 4.

Figure 5:
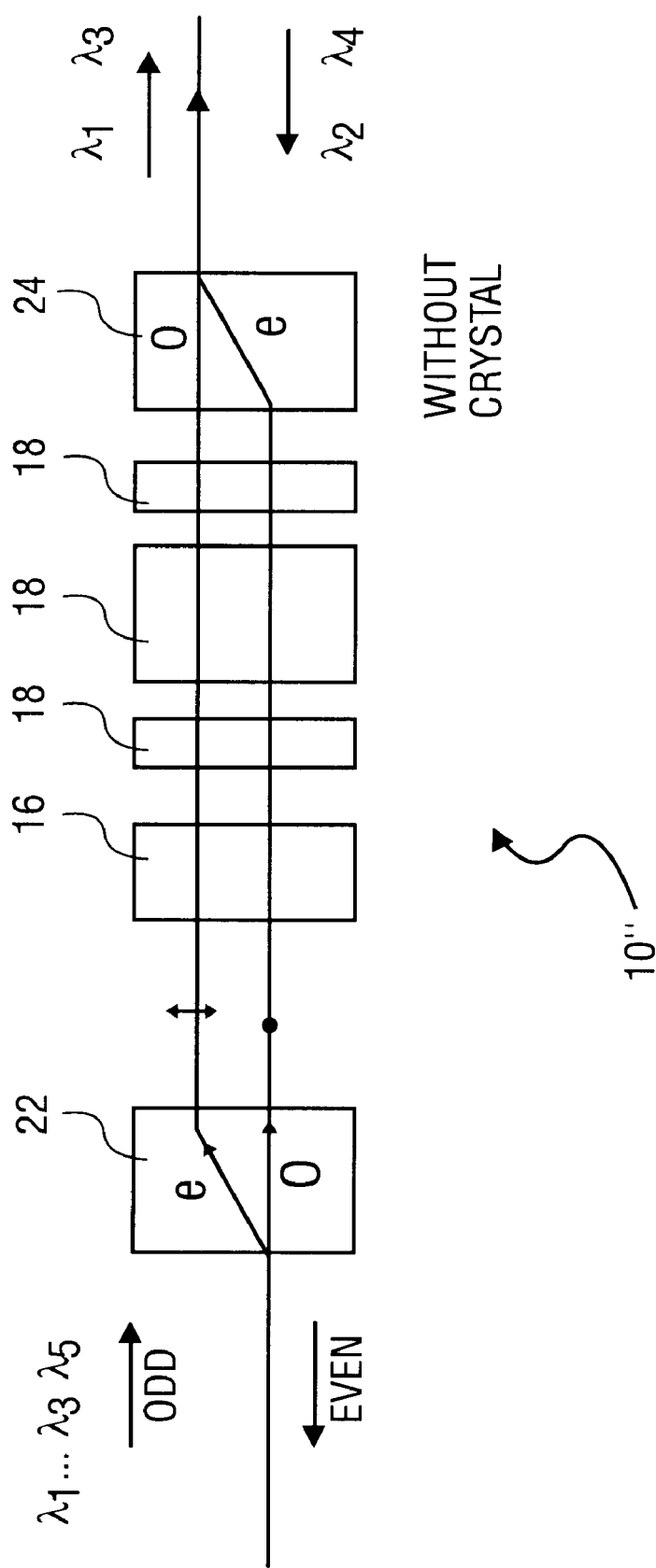
FIG. 5 is a schematic diagram of one embodiment of a wavelength selective isolator of the present invention.

One embodiment of a wavelength selective isolator 10" of the present invention is illustrated in FIG. 5. In this embodiment, apparatus 10" includes a first walk-off crystal 22 with a first port and a second port, and a second walk-off crystal 24 with a third port and a fourth port. Walk-off crystals 22 and 24 provide either a spatial or angular walk-off for the two input polarizations. FIG. 5 illustrates an embodiment with spatial walk-off. In the angular walk-off embodiment, wedged shaped birefringent crystals 16 are utilized as is well known in the art. Walk-off crystals 22 and 24 can be made of a variety of different materials, including but not limited to $LiNbO_3$, $TiO_2$, calcite and the like.

Non-reciprocal phase rotator 16 and a plurality of birefringent crystals 18 are positioned between first and second walk-off crystals 22 and 24. Optionally included is a half-wave plate 20 positioned between non-reciprocal phase rotator 16 and birefringent crystal 18.

Figure 6:
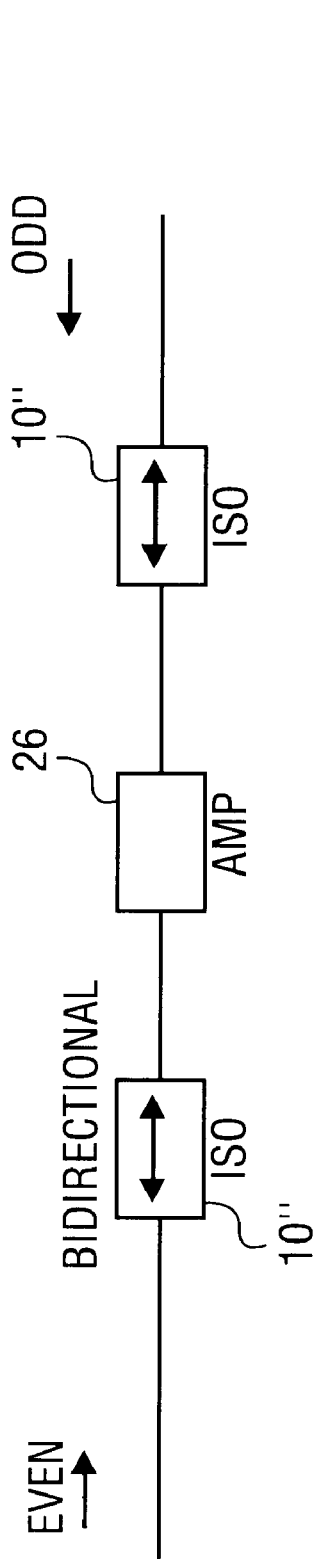
FIG. 6 is a schematic diagram of one embodiment of an apparatus of the present invention with an amplifier positioned between two FIG. 5 isolators.
Figure 7:
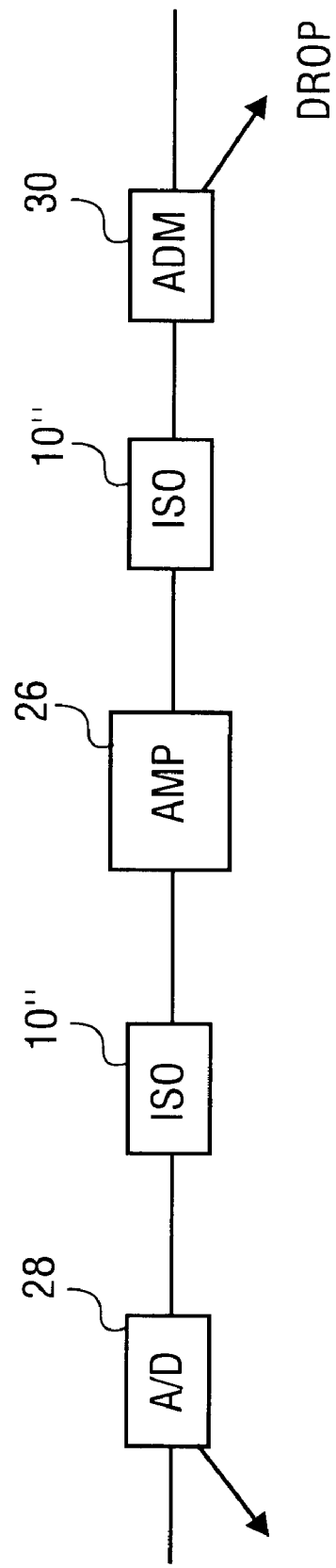
FIG. 7 is a schematic diagram of one embodiment of the FIG. 6 apparatus with the inclusion of two add/drop multiplexers.

As illustrated in FIG. 6, an amplifier 26 can be positioned between two FIG. 5 isolators 10". Referring to FIG. 7, another embodiment of the present invention includes amplifier 26 positioned between two isolators 10". A first add/drop multiplexer 28 is coupled to one of the isolators 10" and a second add/drop multiplexer 30 is coupled to the second isolator 10".

Figure 8:
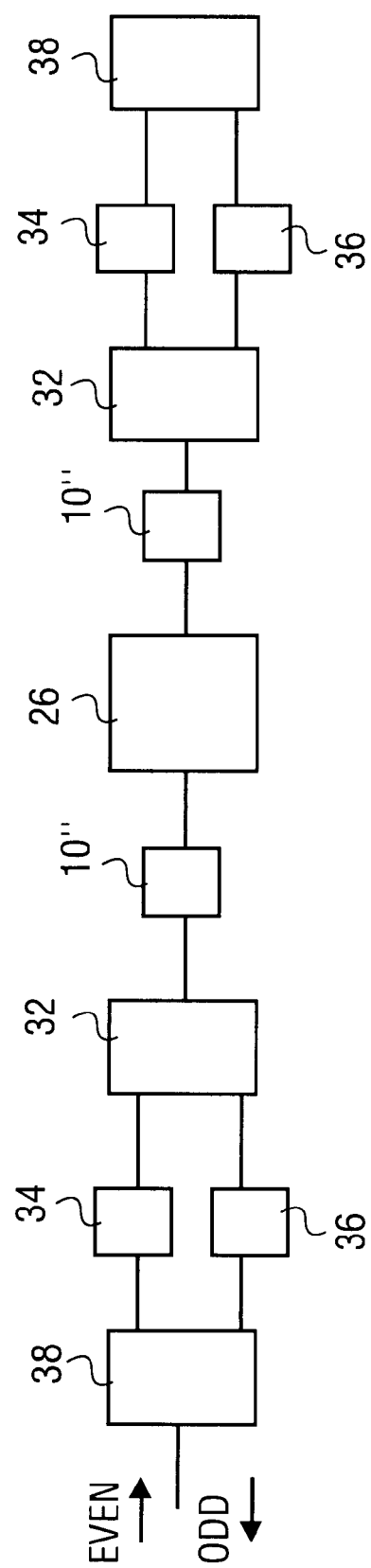
FIG. 8 is a schematic diagram of another embodiment of the present invention with two FIG. 5 isolators, an amplifier, multiplex interleavers and multiple add/drop multiplexers.

Referring now to FIG. 8, one embodiment of the present invention includes amplifier 26 coupled to isolators 10". Each isolator 10" is coupled to n interleaver 32. Each interleaver 32 is coupled to two add/drop multiplexers 34 and 36 which are in turn coupled to another interleaver 38.

Figure 9:
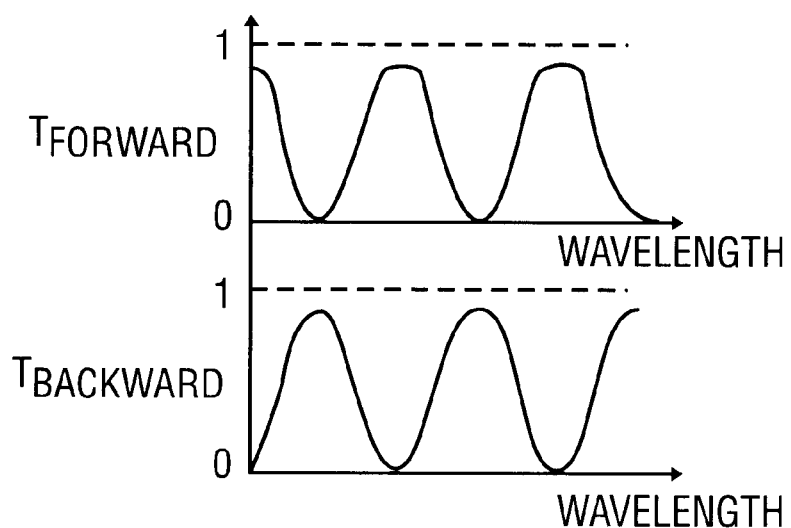
FIG. 9 illustrates the filter spectrum of the FIG. 4 device.

FIG. 9 shows the filter spectrum of the combined device. The transmission peaks are flattened and the transmission bottoms are widened.

Figure 10:
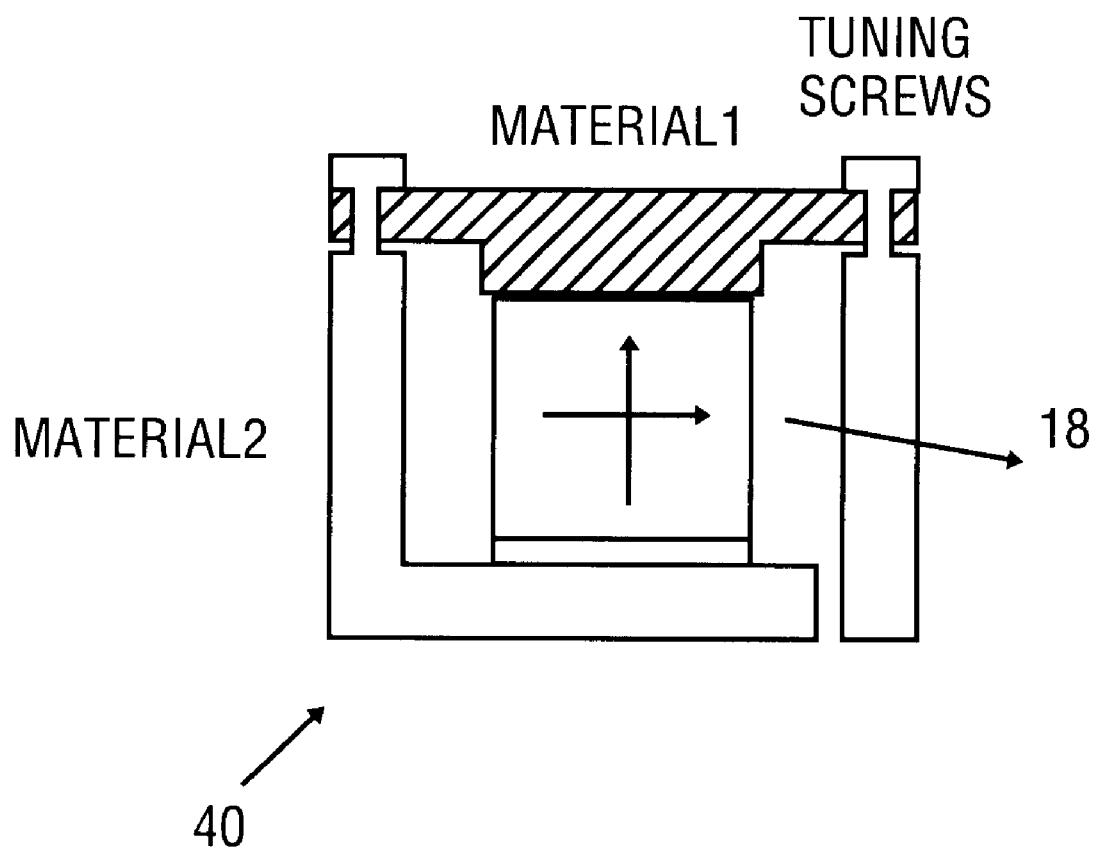
FIG. 10 is a cross-sectional view of a temperature compensating structure that applies temperature-dependent stress proportional to the temperature changes to the birefringent crystal along its birefringence axis.

As illustrated in FIG. 10, a temperature compensating structure 40, or other equivalent structure, can be used with birefringent crystal 18 to apply temperature-dependent stress proportional to the temperature changes to birefringent crystal 18 along its birefringence axis. In this embodiment, the temperature dependent stress is determined by the thermal expansion coefficients and the thickness of the compensating structure 40 materials. Since the stress-induced birefringence is added to the original birefringence of birefringent crystal 18 the temperature dependence of the phase delay can be eliminated. In the embodiment illustrated in FIG. 10, tuning screws are used for tuning the initial stress and thus the channel or band of transmission peak.

In one specific embodiment, birefringent crystal 18 is a calcite block with thickness of 1.4 cm and a channel or band period $\Delta\lambda$ that becomes 1 nm. Additionally, the two delays between polarizations can be created by using a polarizing beam splitter and then physically making the delay different. Preferably, the delay is inverse to the channel spacing.

Figure 11:
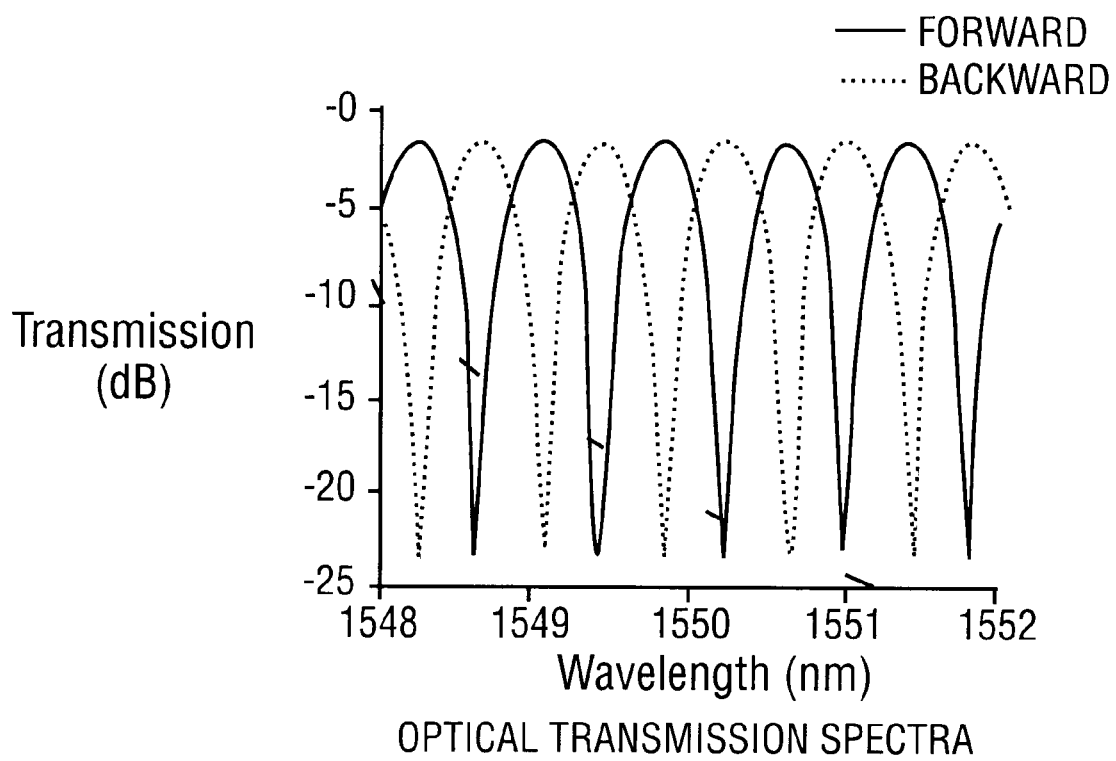
FIG. 11 illustrates the optical transmission spectra of an apparatus of the present invention.

In another specific embodiment, apparatus 10 was fabricated in a polarization-insensitive configuration. A calcite block with a thickness of 1.75 cm was used for birefringent crystal 16. FIG. 11 is a graph of measured transmission spectra of the apparatus 10 in this specific embodiment, plotted in dB scale. The channel or band period was 0.8 nm and the insertion loss and the extension ration were 2 dB and 23 dB, respectively.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An optical data apparatus, comprising:
   a first polarizing beam splitter with a first port and a second port, the first polarizing beam splitter configured to receive an input and split the input into first and second orthogonal polarizations;
   a second polarizing beam splitter with a third port and a fourth port; a non-reciprocal phase rotator positioned between the first and second polarizing beam splitters; and
   a first birefringent crystal positioned between the first and second polarizing beam splitters.

2. The apparatus of claim 1, further comprising:
   a half-wave plate positioned between the non-reciprocal phase rotator and the birefringent crystal.

3. The apparatus of claim 1, wherein the non-reciprocal phase rotator is a Faraday rotator.

4. The apparatus of claim 1, wherein the non-reciprocal phase rotator is a current controlled Faraday rotator.

5. The apparatus of claim 4, wherein the current controlled Faraday rotator provides a switching of wavelength directionality.

6. The apparatus of claim 1, wherein a first input received at the first port includes odd and even wavelengths that are split into first and second groups, and a second input received at the second port includes odd and even wavelengths that are split into first and second groups.

7. The apparatus of claim 6, wherein odd wavelengths from the first port are an output at the third port, and the even wavelengths from the second port are an output at the third port.

8. The apparatus of claim 7, wherein even wavelengths from the first port are an output at the fourth port, and odd wavelengths from the second port are an output at the fourth port.

9. The apparatus of claim 1, wherein odd wavelengths from the first port and even wavelengths from the second port are an output of the third port, and even wavelengths from the first port and odd wavelengths from the second port are an output of the fourth port.

10. The apparatus of claim 1, wherein the optical data apparatus is a wavelength-dependent circulator.

11. The apparatus of claim 1, wherein the optical data apparatus is a non-reciprocal wavelength interleaver.

12. The apparatus of claim 1, wherein the optical data apparatus is a non-reciprocal, switching wavelength interleaver that provides a switching of wavelength directionality.

13. The apparatus of claim 1, wherein the optical data apparatus is a wavelength dependent isolator.

14. The apparatus of claim 1, wherein birefringent axes of the first birefringent crystal are positioned to provide equal splitting of an input polarization onto two different path delays by the first birefringent crystal.

15. The apparatus of claim 1, further comprising:
   a second birefringent crystal positioned adjacent the first birefringent crystal.

16. The apparatus of claim 15, wherein the second birefringent crystal is positioned at a different angle than the first birefringent crystal.

17. The apparatus of claim 15, wherein the first and second birefringent crystals each have a different thickness.

18. The apparatus of claim 1, further comprising:
   a plurality of individual birefringent crystals positioned adjacent to the first birefringent crystal.

19. The apparatus of claim 18, wherein at least a portion of individual birefringent crystals are positioned at different angles with respect to each other.

20. The apparatus of claim 18, wherein at least a portion of individual birefringent crystals are positioned at the same angle with respect to each other.

21. The apparatus of claim 18, wherein at least a portion of the plurality of individual birefringent crystals have different thicknesses.

22. The apparatus of claim 18, wherein at least a portion of the plurality of individual birefringent crystals have different delay widths between two orthogonal polarizations.

23. An optical data apparatus, comprising:
   a first polarization splitter configured to receive an input and split the input into first and second orthogonal polarizations;
   a second polarization splitter configured to combine the first and second orthogonal polarizations;
   a non-reciprocal phase rotator positioned between the first and second polarization splitters; at least a first birefringent crystal positioned between the first and second polarization splitters and create wavelength dependent bi-directionality; wherein birefringent axes of the first birefringent crystal are positioned to provide equal splitting of an input polarization onto two different path delays by the first birefringent crystal; and
   a second birefringent crystal positioned adjacent the first birefringent crystal.

24. The apparatus of claim 23, wherein the non-reciprocal phase rotator is a Faraday rotator.

25. The apparatus of claim 23, wherein the non-reciprocal phase rotator is a current controlled Faraday rotator.

26. The apparatus of claim 25 wherein the current controlled Faraday rotator provides a switching of wavelength directionality.

27. The apparatus of claim 23, wherein the optical data apparatus is a wavelength dependent isolator.

28. The apparatus of claim 23, wherein the optical apparatus is a non-reciprocal wavelength interleaver.

29. The apparatus of claim 23, wherein the optical data apparatus is a non-reciprocal, switching wavelength interleaver that provides a switching of wavelength directionality.

30. The apparatus of claim 23, further comprising:
   a half-wave plate positioned between the first polarization splitter and the non-reciprocal phase rotator.

31. An optical data apparatus, comprising:
   a first polarization splitter configured to receive an input and split the input into first and second orthogonal polarizations;
   a second polarization splitter configured to combine the first and second orthogonal polarizations;
   a non-reciprocal phase rotator positioned between the first and second polarization splitters;
   at least a first birefringent crystal positioned between the first and second polarization splitters and create wavelength dependent bi-directionality; and
   a plurality of individual birefringent crystals positioned adjacent to the first birefringent crystal.

32. The apparatus of claim 31, further comprising:
   wherein at least a portion of individual birefringent crystals are positioned at different angles with respect to each other.

33. The apparatus of claim 31, wherein at least a portion of individual birefringent crystals are positioned at the same angle with respect to each other.

34. The apparatus of claim 31, wherein at least a portion of the plurality of individual birefringent crystals have different thicknesses.

35. The apparatus of claim 31, wherein at least a portion of the plurality of individual birefringent crystals have different delay widths between two orthogonal polarizations.

36. An optical data apparatus, comprising:
a first isolator, including:
a first polarization splitter configured to receive an input and split the input into first and second orthogonal polarizations,
a second polarization splitter configured to combine the first and second orthogonal polarizations,
a non-reciprocal phase rotator positioned between the first and second polarization splitters,
at least two birefringent crystals positioned between the first and second polarization splitters to create wavelength dependent bi-directionality; and
an amplifier coupled to the first isolator.

37. The apparatus of claim 36, further comprising: a half-wave plate positioned between the first polarization splitter and the non-reciprocal phase rotator.

38. The apparatus of claim 36, wherein the non-reciprocal phase rotator is a Faraday rotator.

39. The apparatus of claim 36, wherein the non-reciprocal phase rotator is a current controlled Faraday rotator.

40. The apparatus of claim 39, wherein the current controlled Faraday rotator provides a switching of wavelength directionality.

41. The apparatus of claim 36, wherein the optical data apparatus is a wavelength dependent isolator.

42. The apparatus of claim 36, wherein the optical apparatus is a non-reciprocal wavelength interleaver.

43. The apparatus of claim 36, wherein the optical data apparatus is a non-reciprocal, switching wavelength interleaver that provides a switching of wavelength directionality.

44. The apparatus of claim 36, further comprising:
a first interleaver coupled to the first isolator.

45. The apparatus of claim 44, further comprising:
a second isolator coupled to the amplifier with the amplifier being positioned between the first and second isolators.

46. The apparatus of claim 45, further comprising:
a first add/drop multiplexer coupled to the first isolator; and
a second add/drop multiplexer coupled to the second isolator.

47. An optical data apparatus, comprising:
a first isolator,
a first polarization splitter configured to receive an input and split the input into first and second orthogonal polarizations,
a second polarization splitter configured to combine the first and second orthogonal polarizations,
a non-reciprocal phase rotator positioned between the first and second polarization splitters,
at least one birefringent crystal positioned between the first and second polarization splitters to create wavelength dependent bi-directionality;
an amplifier coupled to the first isolator; and
a first add/drop multiplexer coupled to the first isolator.

48. The apparatus of claim 47, further comprising:
a second isolator coupled to the amplifier with the amplifier being positioned between the first and second isolators.

49. The apparatus of claim 48, further comprising:
a second add/drop multiplexer coupled to the second isolator.

* * * * *